United States Patent [19]

Kraus

[11] 4,414,680
[45] Nov. 8, 1983

[54] SELF SUPPORTING OPTICAL DIFFRACTION GRID

[75] Inventor: Heinz Kraus, Traunreut, Fed. Rep. of Germany

[73] Assignee: Dr. Johannes Heidenhain GmbH, Traunreut, Fed. Rep. of Germany

[21] Appl. No.: 304,082

[22] Filed: Sep. 21, 1981

[30] Foreign Application Priority Data

Oct. 31, 1980 [DE] Fed. Rep. of Germany ....... 3041067

[51] Int. Cl.³ .......................................... G01M 23/20
[52] U.S. Cl. ...................................... 378/84; 378/145
[58] Field of Search ...................... 378/82, 83, 84, 85, 378/145

[56] References Cited

U.S. PATENT DOCUMENTS 4,192,994  3/1980  Kastner ................................. 378/84

OTHER PUBLICATIONS

"XUV Filters: Out of This World and Back Again", Steele, Optical Spectra, Jun. 1976, pp. 37-40.

*Primary Examiner*—Craig E. Church
*Attorney, Agent, or Firm*—Willian, Brinks, Olds, Hofer, Gilson & Lione, Ltd.

[57] ABSTRACT

A self supporting optical diffraction grid for short wavelength electromagnetic radiation includes a peripheral frame, a grid foil secured to the frame and defining a plurality of elongated slits, and a supporting net, large meshed with respect to the grid constant of the grid foil, secured to the frame to support the grid foil. According to a first feature of this invention, an edge of the frame adjacent the grid foil is provided with a nonrectilinear pattern such that the width of the frame varies from point to point around the frame in order to provide a relatively wide transition zone between the grid foil and the frame and to reduce peak mechanical stress in the transition zone. According to a second aspect of this invention, a supporting grid is secured to the frame and the grid foil in a transition zone between the frame and the grid foil. The supporting grid is designed to provide a gradually decreasing bending rigidity in the transition zone between the frame and the grid foil in order to reduce peak mechanical stress in the transition zone.

20 Claims, 6 Drawing Figures

SELF SUPPORTING OPTICAL DIFFRACTION GRID

BACKGROUND OF THE INVENTION

This invention relates to an improved self supporting optical diffraction grid for short wavelength electromagnetic radiation, such as extreme ultraviolet and x-ray radiation.

Such diffraction grids are used, for example, in the investigation of extraterrestrial radiation sources (extreme ultraviolet and x-ray sources). In many cases, such diffraction grids are installed in suitable optical instruments which are placed into earth orbit outside the earth's atmosphere by rocket launch vehicles. Such diffraction grids must therefore exhibit the necessary optical properties and in addition must exhibit mechanical properties that are compatible with the heavy mechanical loads on the diffraction grids bearing the launch phase.

In order to function properly in terms of optical characteristics, such diffraction grids must have extremely fine grain grid structures in which the grid constants often are less than one micron. Stresses associated with sound waves encountered during the launch phase present particularly serious threats to the integrity of such grids. These diffraction grids include grid foils which, when excited by periodic air pressure fluctuations, are exposed to a continuous bending stress. Generally, the smallest bending radii and therefore the most severe material fatigue occur in a narrow transition zone between the relatively flexible grid foil and a relatively rigid surrounding frame.

In the article entitled "XUV Filters-Out Of This World And Back Again" published in *Optical Spectra*, June, 1976, at pages 37–40, methods for ruggedizing homogeneous filter foils are disclosed. The method disclosed at page 38 involves the application of a layer of an inorganic material which dries in the manner of a lacquer to the edges of the foil to improve its mechanical stability. This method, however, is not directly applicable to diffraction grid foils of the type described above, because in consequence of the capillary action within the grid foil, the width of the solidification zone of the organic material cannot readily be maintained at a desired predetermined width, and often no wedge-shaped film of organic material develops. In addition, the capillary action mentioned above can often result in undesirably wide border zones which can reduce the usable aperture of the grid foil to an unacceptable extent.

SUMMARY OF THE INVENTION

The present invention is directed to structures for use with self supporting optical diffraction grids which modify the bending rigidity of the grid foil in the transition zone between the foil and the surrounding frame. The bending rigidity of the foil in the transition zone is modified in such a way that locally narrowly bounded zones of especially severe bending or distortion are avoided, even when the grid foil is subjected to oscillation due to unavoidable acoustical stresses. In this way, the fatiguing of materials is reduced and therefore the prospect of foil breakage is reduced as well, all without substantially impairing the optical properties of the diffraction grid.

According to this invention, a self supporting optical diffraction grid for short wavelength electromagnetic radiation is provided which comprises a peripheral frame, a grid foil secured to the frame, and a supporting net, large meshed with respect to the grid constant of the grid foil, secured to the frame to support the foil. According to a first aspect to this invention, an edge of the frame adjacent the grid foil is shaped to define a nonrectilinear pattern. This nonrectilinear pattern can be either a statistical or a regular pattern. In either case this invention provides a transition zone preferably having a width greater than the grid spacing of the grid foil. This transition zone provides a bending rigidity which decreases gradually from a greater value adjacent to the frame to a smaller value adjacent to the grid foil.

According to a second aspect to this invention an optical diffraction grid having a frame, a grid foil and a supporting net of the type described above is also provided with a supporting grid which is secured to the frame and to the grid foil in the transition zone between the frame and the grid foil in order to avoid narrowly bounded zones of especially severe bending or distortion. The supporting grid of this invention provides a significant reduction in breakage of the grid foil, even when frames of substantially constant widths are used.

One important advantage of this invention is that the transition zone strengthening means of this convention (either the patterned frame edge or the supporting grid) can be manufactured at substantially no additional manufacturing expense. This is because the exposure mask for the photolithographic production of the grid foil, the frame, and the supporting net can simply and inexpensively be formed to define a frame of varying widths according to the first aspect of this invention, or a supporting grid according to the second aspect to this invention. The particular pattern used for the transition zone between the grid foil and the frame can be designed to function in an optimal manner with respect to the particular stresses expected for any given grid. This is particularly true since in the mass production of such self supporting optical diffraction grids, the pattern in the transition zone is in each case identical.

The invention itself, together with further objects and attendant advantages, will best be understood by reference to the following detailed description taken in connection with the accompanying drawings.

BRIEF DESCRIPTION OF THE DRAWINGS

FIG. 1b is a plan view of the prior art grid of the FIG. 1a.

DETAILED DESCRIPTION OF THE PRESENTLY PREFERRED EMBODIMENTS

Figure 1A:
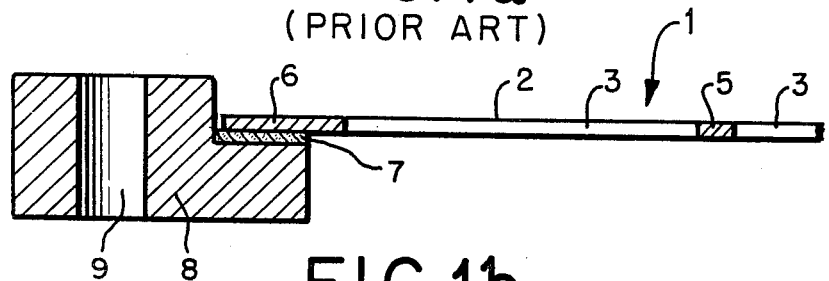
FIG. 1a is a cross sectional view of a known, prior art, self supporting optical diffraction grid.
Figure 1B:
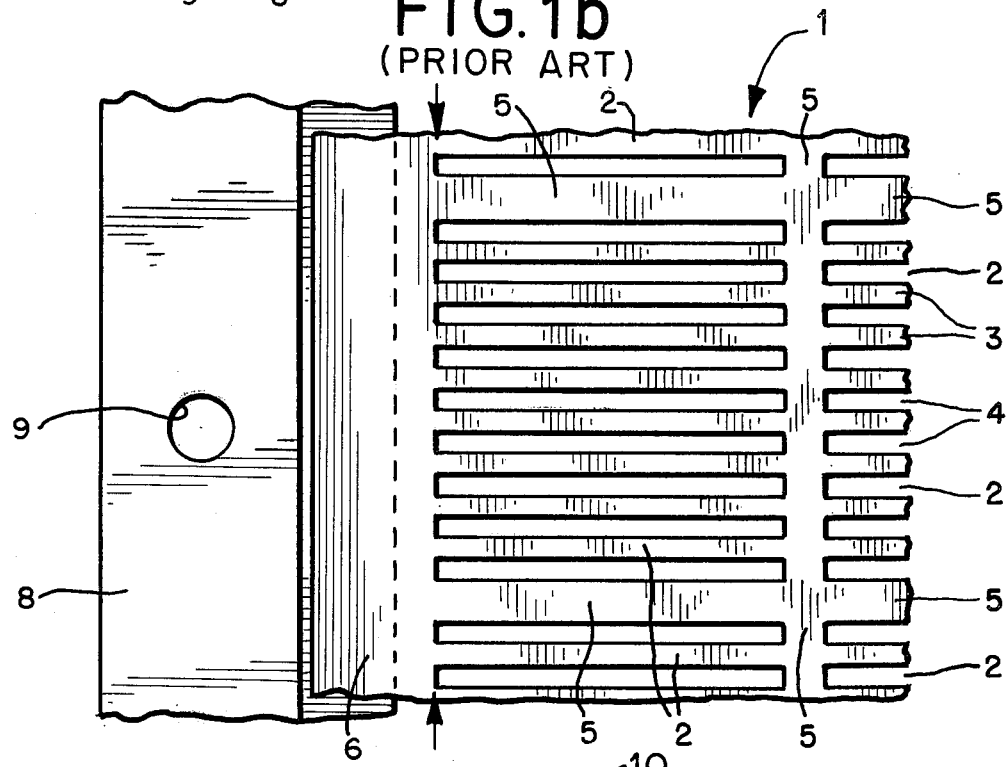

Turning now to the drawings, FIGS. 1a and 1b show a known, prior art, self supporting optical diffraction grid in cross section and in plan view, respectively. This prior art grid includes a perforated grid foil 2 which defines a plurality of elongated, parallel bars 3 separated by elongated slits 4. The perforated grid foil 2 defines a supporting net 5 which is large meshed with respect to the grid constant of the grid 1. A surrounding frame 6 is secured to the supporting net 5 and to the perforated grid foil 2 about the perimeter of the grid foil 2. The frame 6 is connected by means of a suitable layer of adhesive 7 to a holder 8 which defines a bore 9 for fastening the holder 8 in place in an optical instrument (not shown). In FIG. 1b, the arrows are used to indicate the transition zone between the frame 6 and the grid foil 2. In the prior art device of FIGS. 1a and 1b, this transition zone is an extremely sharp, rectilinear border which allows small bending radii, high levels of material fatigue, and therefore an increased danger of breakage to develop under an alternating mechanical or acoustical stress.

Figure 2:
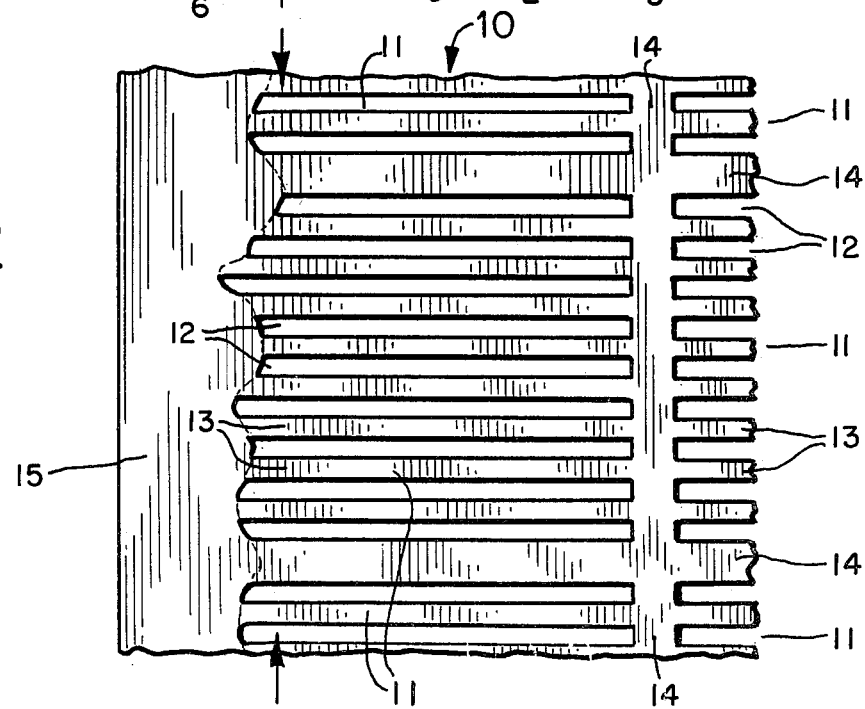
FIG. 2 is a plan view of a first preferred embodiment of the self supporting optical diffraction grid of this invention.
Figure 3:
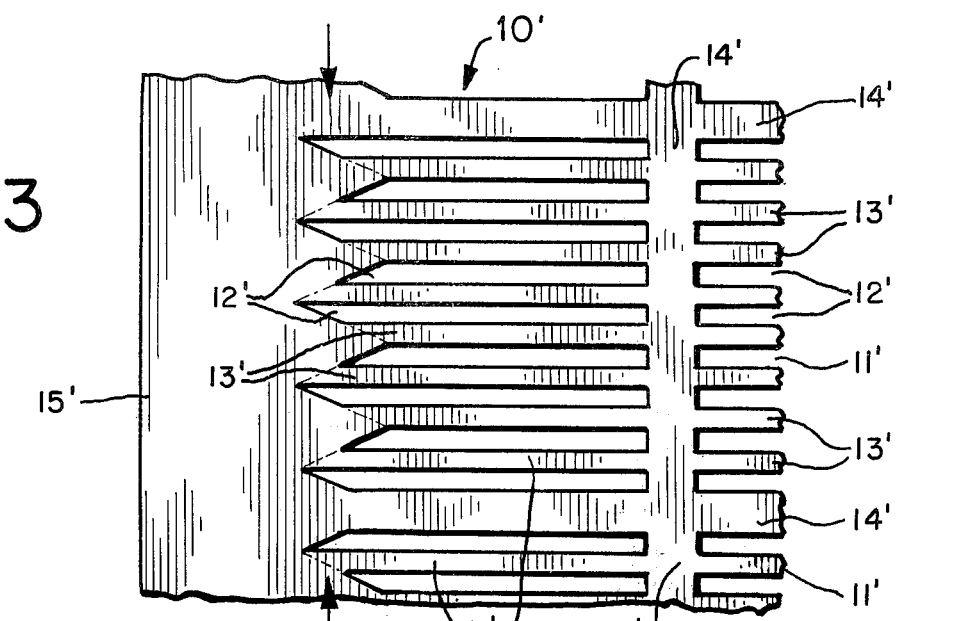
FIG. 3 is a plan view of a second preferred embodiment of the diffraction grid of this invention.

As explained above, the present invention is directed to structures for avoiding such small bending radii and attendant material fatigue. FIGS. 2 and 3 show first and second preferred embodiments of this invention which include self supporting grids 10,10', respectively. In each case, a grid foil 11,11' is provided with parallel bars 12,12' and parallel elongated slits 11,11' separating the bars 12,12', respectively. A supporting net 14,14' is secured to a surrounding peripheral frame 15,15' in order to strengthen the grid 10,10'. In the first embodiment of FIG. 2, the edge of the frame 15 facing the grid foil 11 defines a statistical pattern such that the width of the frame varies from point to point around the frame. FIG. 3 shows a second preferred embodiment, similar to that of FIG. 1 except that the edge of the frame 15' adjacent the grid foil 11' defines a regular, repeating pattern.

Because the embodiments in both FIGS. 2 and 3 provide a structure in which the transition zone (indicated by the arrows) is substantially wider than the grid constant of the grid foil 11,11', bending stresses are distributed over a transition zone substantially wider than the grid constant of the grid 10,10'. This is because the end sections of the elongated slits 13,13' are staggered with respect to one another adjacent the frame 15,15'. These end sections define a transition zone between the frame and the grid foil, which transition zone has a width greater than the grid constant of the grid. The bending rigidity of the transition zone decreases gradually from a greatest value adjacent the frame 15,15' to a smaller value adjacent the grid foil 11,11'. Thus, instead of a sharp transition between the relatively flexible grid foil 11,11' and the relatively rigid frame 15,15', the embodiments of FIGS. 2 and 3 provide a gradual transition which results in larger bending radii and reduced mechanical fatigue as compared with the structure of FIGS. 1a and 1b.

Figure 4:
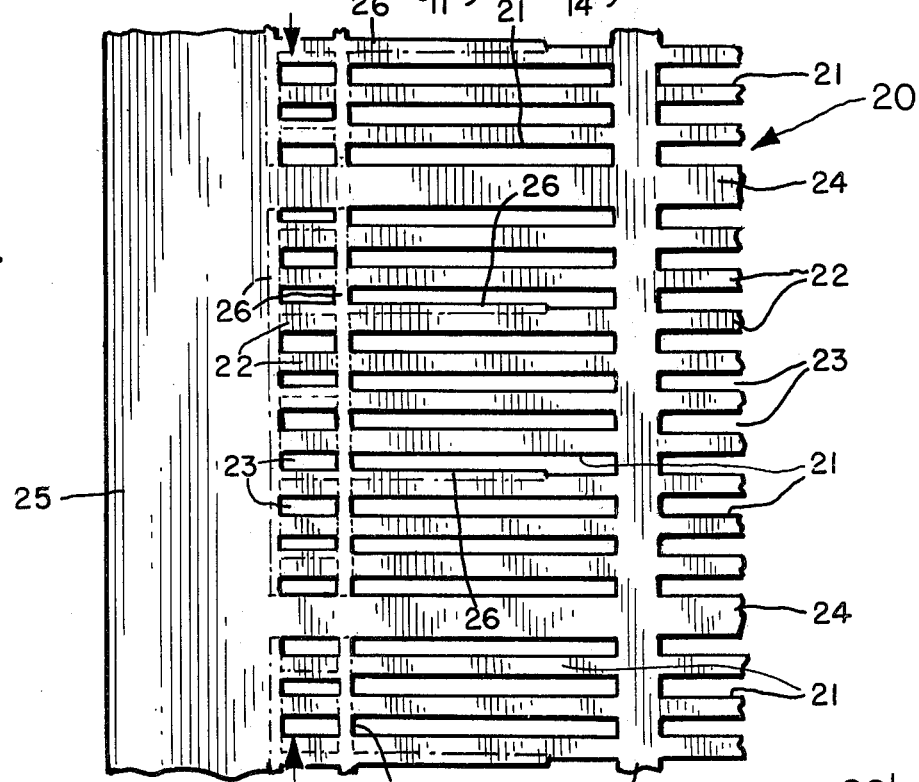
FIG. 4 is a plan view of a third preferred embodiment of the diffraction grid of this invention.
Figure 5:
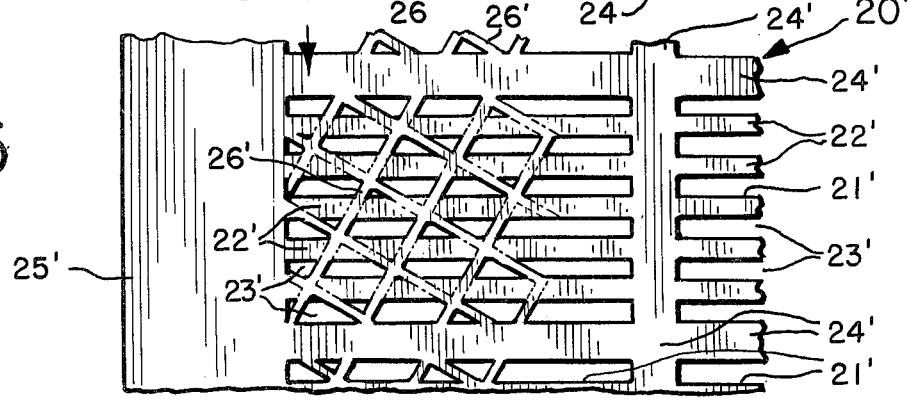
FIG. 5 is a plan view of a fourth preferred embodiment of the diffraction grid of this invention.

A second aspect of this invention is illustrated in the embodiments of FIGS. 4 and 5 which show grids 20,20'. In each case, a grid foil 21,21' defines a plurality of parallel bars 22,22' separated by elongated slits 23,23', respectively. The grid foil 21,21' is arranged with a supporting net 24,24' in a surrounding frame 25,25', respectively. In the transition zone (indicated by the arrows) between the frame 25 and the grid foil 21 there is supplied a patterned supporting grid 26, the density of which diminishes from the edge of the frame 25 to the grid foil 21. The embodiment of FIG. 5 includes a patterned supporting grid 26' in the transition zone (indicated by the arrows) between the frame 25' and the grid foil 21'. In the embodiment of FIG. 5 the supporting grid 26' is oriented at a skew angle with respect to the elongated slits 23' of the grid foil 21'.

Preferably, in the embodiments of FIGS. 2 and 3 the grid foils 11,11', the supporting nets 14,14', the frame 15,15' are all formed of a single piece of material as a single seamless unit, respectively. Similarly, both of the embodiments of FIGS. 4 and 5 are preferably formed with the grid foils 21,21', the supporting nets 24,24', the frames 25,25', and the supporting grids 26,26' of a single piece of material as a single seamless unit, respectively. Preferably, the material used for these elements of the invention is gold. In the foregoing description and the following claims, the term "foil" has been used to encompass thin sheets of material such as gold or other metals. However, it should be understood that the term foil is being used in its broad sense and is not necessarily limited to sheets of metal.

The patterned frame edges described above in connection with FIGS. 2 and 3 and the patterned supporting grid described above in connection with FIGS. 4 and 5 can be used either alone as shown or in combination one with the other in order optimally to protect a grid from the particular mechanical stresses anticipated. Through the use of suitable patterns the optical characteristics of the grid can be optimized and various optical artifacts such as ghosts can be avoided. The grids of this invention can, in a manner not shown, be provided with holders similar to the holder 8 of FIG. 1a.

Of course, it should be understood that various changes and modifications to the preferred embodiments described above will be apparent to those skilled in the art. For example, the particular patterns used to define the edge of the frame or the supporting grids can be altered from the illustrated forms to suit particular needs. It is therefore intended that the foregoing detailed description be regarded as illustrative of the presently preferred embodiments of the invention rather than as limiting the scope of the invention. It is intended that the following claims, including all equivalents, define the scope of this invention.

I claim:

1. A self supporting optical diffraction grid for short wavelength electromagnetic radiation, said grid comprising:
   a peripheral frame;
   a grid foil secured to the frame, said grid foil defining a plurality of elongated slits;
   a supporting net, large meshed with respect to the grid constant of the grid foil, secured to the frame to support the grid foil; and
   at least one edge of the frame adjacent the grid foil defining a nonrectilinear pattern.

2. A self supporting optical diffraction grid for short wavelength electromagnetic radiation, said grid comprising:
   a peripheral frame;
   a grid foil secured to the frame, said grid foil defining a plurality of elongated slits;
   a supporting net, large meshed with respect to the grid constant of the grid foil, secured to the frame to support the grid foil; and
   a supporting grid secured to the frame and the grid foil in a transition zone between the frame and the grid foil.

3. The invention of claim 1 wherein the pattern defined by the edge of the frame adjacent the grid foil is a statistical pattern.

4. The invention of claim 1 wherein the pattern defined by the edge of the frame adjacent the grid foil is a regular pattern.

5. The invention of claim 2 wherein the density of the supporting grid decreases from a maximum value near the frame to a lower value remote from the frame.

6. The invention of claim 2 wherein the supporting grid intersects the elongated slits at a skew angle.

7. The invention of claim 1 wherein the frame, the grid foil, and the supporting net are all formed of a single piece of material as a single, seamless unit.

8. The invention of claim 7 wherein the single piece of material comprises a gold foil.

9. The invention of claim 2 wherein the frame, the grid foil, the supporting grid and the supporting net are formed by a single piece of material as a single, seamless unit.

10. The invention of claim 9 wherein the single piece of material comprises a gold foil.

11. A self supporting optical diffraction grid for short wavelength electromagnetic radiation, said grid comprising:

a frame;

a grid foil secured to the frame, said grid foil defining a plurality of elongated slits, adjacent slits being separated by a predetermined distance, at least a portion of said slits each defining a respective first end section adjacent the frame, adjacent ones of the first end sections staggered with respect to one another such that the first end sections define a transition zone between the frame and the grid foil, said transition zone having a width greater than the predetermined distance, and the bending rigidity of the transition zone decreasing gradually from a greatest value adjacent the frame to a smaller value adjacent the grid foil; and means for defining a supporting net having a mesh size which is large in comparison with the predetermined distance, said supporting net positioned to strengthen the grid foil.

12. A self supporting optical diffraction grid for short wavelength electromagnetic radiation, said diffraction grid comprising:

a frame;

a grid foil secured to the frame, said grid foil defining a plurality of elongated slits, adjacent slits being separated by a predetermined distance, at least a portion of said slits each defining a respective first end section adjacent the frame;

means for defining a supporting grid in a transition zone between the elongated slits and the frame adjacent the first end sections, said supporting grid acting to increase the bending resistance of the grid foil in the transition zone from a smallest value at the edge of the transition zone remote from the frame to a greater value at the edge of the transition zone adjacent the frame; and means for defining a supporting net having a mesh size which is large in comparison with the predetermined distance, said supporting net positioned to strengthen the grid foil.

13. The invention of claim 11 wherein a curve passing through the first end sections defines a statistical pattern.

14. The invention of claim 11 wherein a curve passing through the first end sections defines a regular pattern.

15. The invention of claim 12 wherein the density of the supporting grid decreases from a larger value at the edge of the supporting grid adjacent the frame to a smaller value at the edge of the supporting grid remote from the frame.

16. The invention of claim 12 wherein the supporting grid intersects the elongated slits of the foil at a skew angle.

17. The invention of claim 11 wherein the frame, the grid foil, and the supporting net are all formed of a single piece of material as a single, seamless unit.

18. The invention of claim 17 wherein the single piece of material comprises a gold foil.

19. The invention of claim 12 wherein the frame, the grid foil, the supporting grid and the supporting net are formed of a single piece of material as a single, seamless unit.

20. The invention of claim 19 wherein the single piece of material comprises a gold foil.

* * * * *